June 6, 1967    R. H. SKIDMORE ETAL    3,323,222
APPARATUS AND METHOD FOR DEWATERING AND DRYING RUBBER
Filed Feb. 17, 1965    4 Sheets-Sheet 1
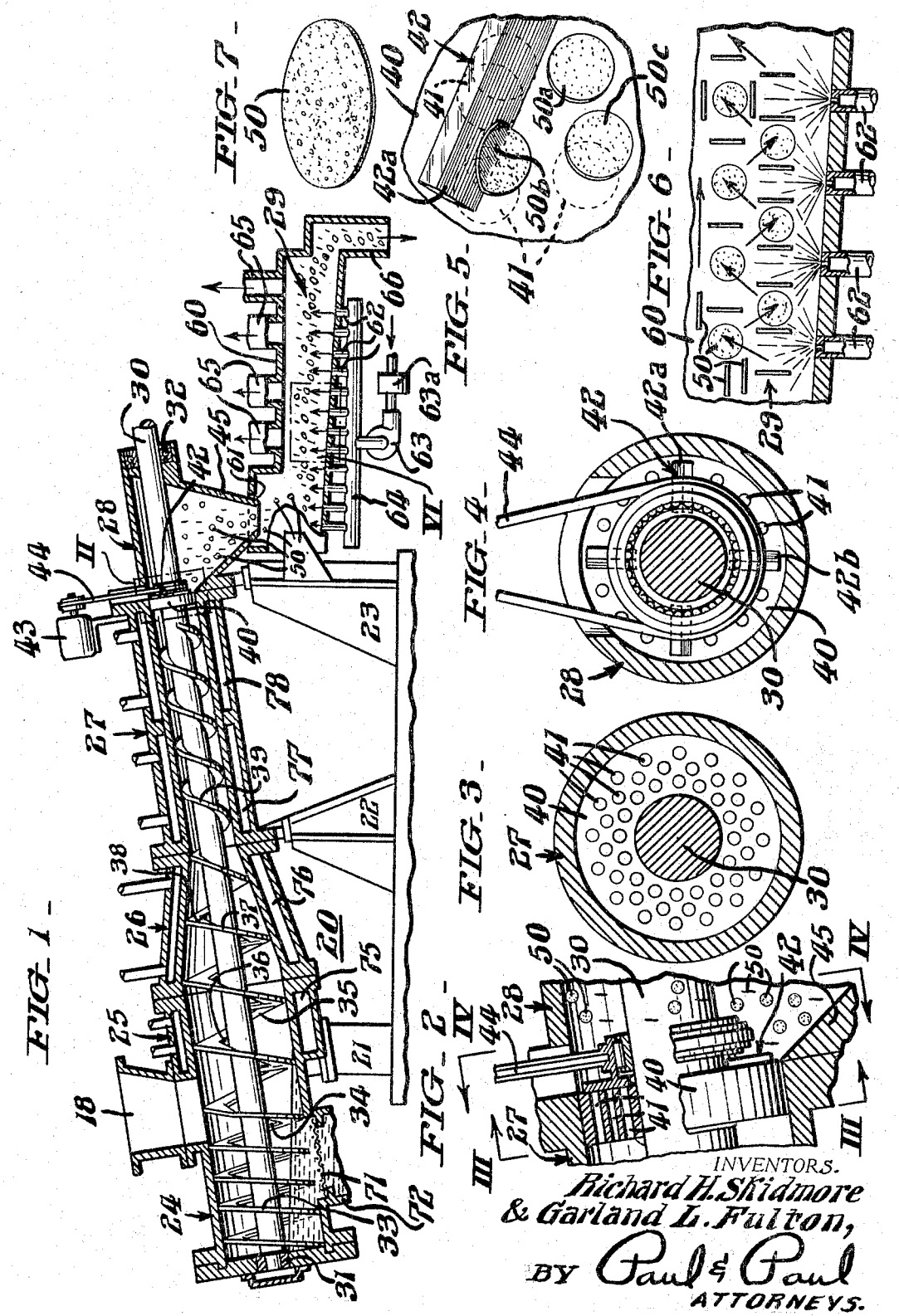
INVENTORS.
Richard H. Skidmore
& Garland L. Fulton,
BY Paul & Paul
ATTORNEYS.

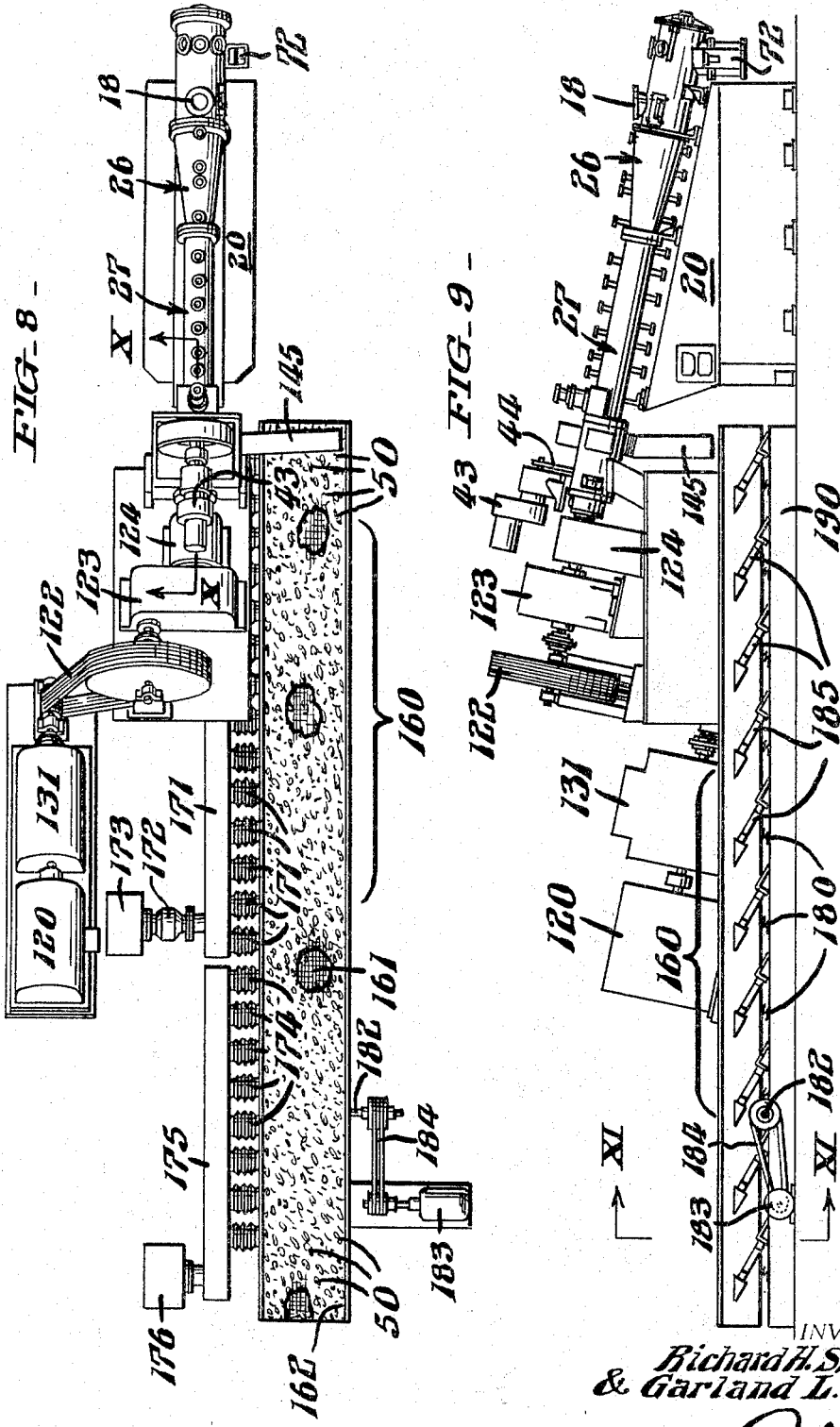

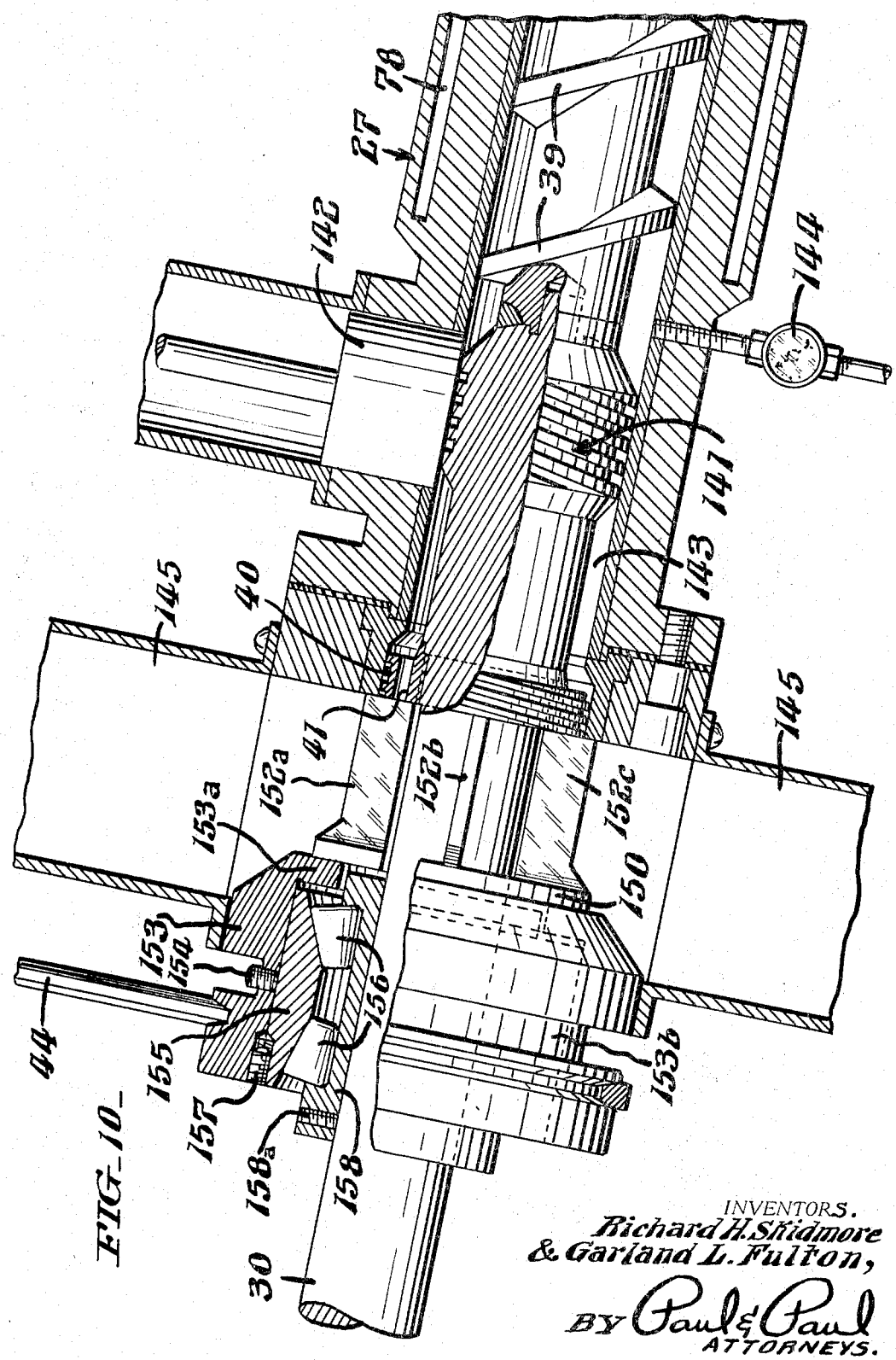

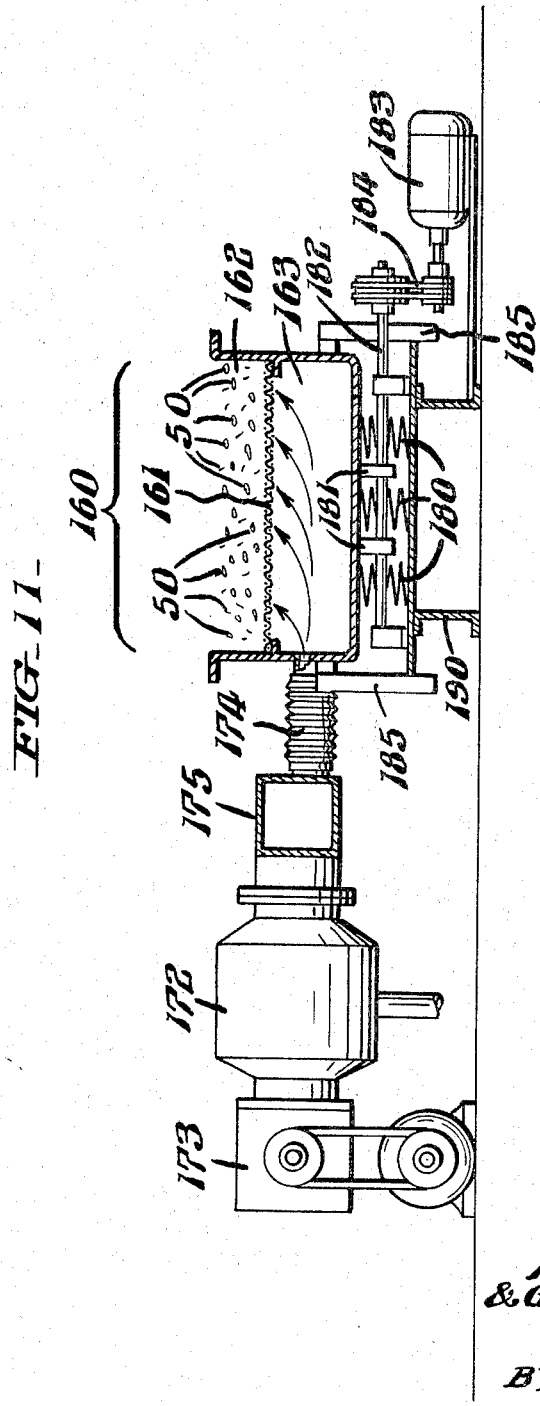

United States Patent Office 3,323,222
Patented June 6, 1967

3,323,222
APPARATUS AND METHOD FOR DEWATERING AND DRYING RUBBER
Richard H. Skidmore and Garland L. Fulton, Strafford, Pa., assignors to Welding Engineers, Inc., Norristown, Pa., a corporation of Delaware
Filed Feb. 17, 1965, Ser. No. 433,378
6 Claims. (Cl. 34—17)

This invention relates to an apparatus and method for removing a volatile substance from a plastic material, and particularly concerns a method for dewatering and drying a rubber-like material.

We are aware of the prior patent to Rossiter No. 3,035-306, granted to the assignee hereof, which discloses a dewatering apparatus and method, which operates continuously and efficiently to remove large volumes of water from plastic material such as rubber and the like. The device according to the Rossiter apparatus is one excellent device for performing the first step of the method according to this invention, as will become apparent further hereinafter.

An object of this invention is to provide a method and apparatus for producing substantially completely dried rubber or other plastic material. Still another object is to provide an apparatus and method of this type, which has the ability to dry the material substantially completely without subjecting it to unduly elevated temperature for an unduly extended period of time. Other objects and advantages of this invention including the simplicity and economy of the same and the ease with which it may be adapted to use in a wide variety of fields, will further become apparent hereinafter and in the drawings of which:

FIG. 1 is a side sectional view showing one form of apparatus in accordance with this invention;

FIGS. 2, 3 and 4 are sectional views taken as indicated by the lines and arrows II, II, III, III and IV, IV which appear in FIGS. 1 and 2;

FIG. 5 is an enlarged view showing one form of cutter device comprising an important feature of this invention;

FIG. 6 is an enlarged fragmentary internal view of a portion of a fluidized bed heating conveyor comprising an important portion of this invention, this figure being an enlargement of the area VI which appears in FIG. 1;

FIG. 7 is an enlarged view of a wafer which may be produced in accordance with a preferred embodiment of this invention;

FIG. 8 is a top plan view of an apparatus comprising another embodiment of this invention;

FIG. 9 is a view in side elevation of the apparatus appearing in FIG. 8;

FIG. 10 is an enlarged section view of a central portion of the apparatus appearing in FIG. 8, taken as indicated by the lines and arrows X, X which appear in FIG. 8; and FIG. 11 is a sectional view taken as indicated by the lines and arrows XI, XI which appear in FIG. 9.

Referring now to FIGS. 1–7, which illustrate one form of apparatus embodying the present invention, there is shown in FIG. 1 a continuous screw press comprising a barrel-like structure identified comprehensively by the reference numeral 20 and supported in an inclined position on the base pedestals 21, 22 and 23.

Considered from a functional point of view, the combined extruder and dryer may be deemed to comprise five sections, in series from left to right as viewed in FIG. 1, namely, a drainage section 24, a feed-in section 25, a compression section 26, an extrusion section 27, a cutting section 28 and a drying section 29.

The shaft or stem 30 of a worm drive extends along the center axis of the barrel-like structure and is suitably supported for rotation as by the bearings 31, 32. Suitable drive means, not shown in FIG. 1, drive the worm stem rotationally at a desired speed, which in a typical case may be of the order of 20–250 revolutions per minute (r.p.m.).

Affixed to the stem 30, in the drainage section 24, is a flight of helical ribbon 33 spaced from the surface of stem 30 leaving therebetween a free space 34 to allow for back-flow of water or other fluid extracted from the rubber or plastic material being extruded.

In the feed-in section 25, the flight is likewise a helical ribbon 35 fixed to but spaced away from the surface of the cylindrical stem 30. The pitch, however, of the helical ribbon 35 in the feed-in section 25 is greater than the pitch of the ribbon 33 in the drainage section 24. The radial dimension of the ribbon 35 is also greater than the radial dimension of the ribbon 33 so that the free space 36 for back-flow of water or other fluid is smaller in the feed-in section 25 than in the drainage section 24.

In the compression section 26, the barrel cylinder tapers, and the radial dimensions of the helical ribbon flight 37 decrease accordingly. As in the other described sections 24 and 25, free space 38 is provided in the compression section 26 between the ribbon 37 and the surface of the stem 30 for back-flow of water or other fluid.

In the extrusion section 27, the worm 39 is integral, or at least in contact, with the surface of the stem 30 and no free space is provided therebetween for back-flow of water or other fluid. The barrel may, however, be longitudinally grooved to increase the forwarding efficiency of the worm flights.

The extrusion section 27 terminates at its forward end in a die plate 40 having therein, as seen most clearly in FIG. 3, a plurality of small holes or orifices 41 through which is forced the rubber or plastic material being extruded. The orifices may, for example, have a diameter as small as ⅛″ or as large as 1½″. The die plate 40 may be fixed to the barrel of extrusion section 27 or may rotate along with the worm stem 30.

In accordance with the present invention, a rotary cutter 42 is mounted for relatively high speed cutting action at the outer face of the die plate 40. It is advantageous to provide variable speed drive means for the cutter so that the wafer thickness can be controlled independently of the throughput rate. Rotary cutter 42 may take any suitable form but in FIGS. 1–7 of the drawings, as seen most clearly in FIG. 4, the cutter is illustrated as comprised of four cutting edges formed by two blades 42a and 42b disposed at right angles with respect to each other.

The cutter 42 may be driven by any suitable means. In FIGS. 1–7, the cutter is illustrated as being driven by a motor 43 and a drive belt 44. Cutter 42 may alternatively be side-mounted on a machine driven from the feed end, if desired.

In the cutter section 28, a chute or hopper 45 is provided below the cutter 40 through which drop the wafers or chips 50 which are severed by the cutter.

Mounted in cantilever fashion on support pedestal 23 and extending forwardly therefrom, is a conveyor 60 that we refer to as a fluidized bed conveyor, having an opening 61 in its upper surface disposed for receiving the discharge end of the hopper 45.

When we refer to a "fluidized bed" conveyor we mean only that the solids conveyed are buoyed up from time to time by hot dry gaseous fluid, thus agitating the particles and providing excellent drying contact. It is not necessary to provide a truly fluidized mixture in the sense that the solids flow in a manner analogous to water.

The movement of the air relative to the particles not only provides excellent drying conditions but also agitates the particles in a manner to reduce their tendency to stick to one another.

The floor of the fluidized bed conveyor 60 is provided with a series of orifices 62 which are directed generally upwardly as indicated by the arrows in FIG. 1. A combined blower 63 and heater 63a is provided for propelling hot air through a manifold 64 into the openings. A series of exhaust ducts or vents 65 is provided in the upper surface of the conveyor structure 60, and a discharge spout 66 is provided for the chips 50. Spout 66 is shown in FIG. 1 projecting downwardly from the floor surface of the conveyor at the extreme forward end of the conveyor structure 60.

The apparatus just described may be used to great advantage to produce substantially completely dried rubber or plastic material without subjecting it to unduly elevated temperatures such as would result from further mechanical working. In addition, this has the advantage of short residence time.

In operation, the rubber or plastic material containing from about 20–60% by weight of a volatile substance such as water, for example, which is separable by squeezing, for example, is introduced into the opening 18 of the primary feed section 25 and tends to substantially fill the bore of the barrel of the drainage and primary feed sections. Screen 71 prevents the introduced material from being discharged from the drainage section through the drain opening 72.

The worm stem 30 is rotated at a speed which in a typical case may be of the order from 20–250 r.p.m. and the material introduced into the barrel is pressed forwardly, and being thus pressed, water or other volatile substance is squeezed out and runs back down the surface of the stem 30 through the spaces 38, 36 and 34 and out through the screen 71 and drain opening 72.

A portion of the feed-in section 25, and all of the compression and extruding sections 26 and 27, are provided with jackets 75, 76, 77 and 78, respectively, through which heated water or steam is caused to flow for controlling the temperature of the interior of the barrel and for assisting in the drying operation.

At the forward end of the extruding section 27, the material is forced through the plurality of orifices 41 in the die plate 40 and into the path of the blades 42a and 42b of the high speed cutter 42. The knife blades operate to slice the protruding extruded material into thin disc-like wafers or chips 50 whose thickness depends upon the relative speed of the cutter 42 and of the forward movement of the extruded matter. The latter is primarily a function of the rotational speed of the worm shaft 30 but is also to some extent at least a function of the material being extruded and its temperature. The invention contemplates that the thickness of the chips 50 will be preferably between about 1/64" and 3/32".

FIG. 5 depicts the extruded material being sliced into wafers or chips by the knife blade 42a or 42b. Reference numeral 50a indicates a chip which has just been completely severed by the knife blade and which is falling. 50b represents a chip in the stage of being cut, the partially severed upper portion falling forward away from the knife blade. Numeral 50c represents material protruding from the next orifice and next to be cut by the knife.

The severed pieces or chips 50 fall down through the hopper 45 and into the chamber of the fluidized bed conveyor 60 where they are met by the upwardly projected streams of hot air projected through the orifices 62 by the blower 63. In this air stream, the wafers or chips 50 are buffeted and tossed about and rapid drying occurs as the chips are moved continuously forward toward the discharge end of the fluid conveyor. The hot, moist air exhausts through the vents 65, and the chips 50, now dried to specification, drop down through the discharge spout 66.

In the form of apparatus described above, the wafers or chips 50 are transported through the drying zone 29 by a vibration-free fluid conveyor 60.

In contrast to the embodiment of FIGS. 1–7, the modified apparatus illustrated in FIGS. 8–11 is adapted to transport the wafers or chips 50 through the drying zone by the assistance of a vibrating type of conveyor.

Referring now particularly to FIGS. 8 and 9, the extruder portion of the apparatus there shown may be the same as that illustrated and described in connection with FIGS. 1–7, and the same parts are identified by the same reference numerals. It will be noted that in FIGS. 8 and 9, the extruder is viewed from the other side as compared with FIG. 1, and accordingly the flow of material is from right to left rather than from left to right as in FIG. 1.

In FIGS. 8 and 9, the drive for worm shaft 30 is shown, and it is to be understood that a similar drive could have been shown for the apparatus of FIG. 1. The drive is shown as being comprised of an A.C. rectifier unit 120, a D.C. unit 131, a belt drive 122, a speed reducer 123 and a coupling 124. Any other conventional drive may be substituted.

The wafers or chips 50 which are severed from the extruded material by the knife or cutter drop down through the discharge chute 145 of FIGS. 8 and 9, and, as seen in FIG. 11, onto a perforated deck 161 which forms an upper section 162 and a plenum section 163, of fluidized bed conveyor 160.

Flexible ducts 170 from manifold 171 introduce heated air into the forward portion of the plenum section 163 at spaced apart openings in the sidewall of the chamber. This heated air may be conveniently obtained from a source of supply comprising a heat exchanger 172, and motor and fan 173. Flexible ducts 174 also connect to the sidewall of chamber 160 at the rearward portion of the plenum section 163 for the introduction of cooling air from the fan 176 via the manifold 175.

To assist in transporting the chips through the upper section 162, from right to left as viewed in FIGS. 8 and 9, the sections 162 and 163 are mounted for vibration by means adapted to impart a lateral forward motion as well as a vertical motion to the chamber. While such means may take any suitable form, the conveyor in the illustrated embodiment of FIGS. 8–11 is shown mounted on a series of angularly disposed coil springs 180.

Eccentrics 181 fixed on cam shaft 182 driven by motor 183 through belt drive 184 tend to impart a reciprocating vertical motion to the conveyor, but the extent of the upward movement of the conveyor is limited by the eccentrics 181. A series of diagonally disposed links 185 is provided, which links are connected between the support base 190 and each side of the conveyor, as seen in FIG. 9. Leaf springs 185 define the radius along which the conveyor is moved. The motion tends to throw the chips forwardly toward the exit end of the conveyor.

While the extrusion section 27, die 40 and cutter 42 of the apparatus of FIGS. 1–7 may also be employed in the apparatus of FIGS. 8–11, modified forms of structure may also be employed. Such a modified form is illustrated in FIG. 10, which is an enlarged view in section looking along the line and in the direction of the arrows X—X of FIG. 8.

Referring now to FIG. 10, intermediate the end of extrusion flight 39 and the die plate 40, a restrictor 141 is provided which in FIG. 10 is illustrated as being a reverse flight, i.e. a flight in which the pitch of the worm is in a reverse direction compared with that of the extrusion drive worm 39. A plug 142, adjustable in a direction perpendicular to that of the axis of the worm, provides a desired amount of clearance at the restrictor 141 and allows the material being extruded to pass into a relief zone 143 provided between the restrictor 141 and the perforated die plate 40. A pressure gage 144 provides the necessary pressure information as to the condition in the extruder just ahead of the restrictor.

The structure shown in FIG. 10 also illustrates a modified form of cutter. In FIG. 10, the cutter comprises an annular base portion 150 having extending therefrom at 90° spacing, four cutter knives 152a, 152b, 152c and 152d (not visible). The shanks of the knives extend in the axial direction of the worm stem 30, and the knives are adjustable, as will be described. The annular base portion 150 of the cutter is secured, as by welding, to the flange portion 153a of a pulley 153 drive from motor 43 by belt 44. Pulley 153 has a central annular groove 153b, and is adjustably mounted in the axial direction, as by set screw 154. Pulley 153 is mounted for rotation on a roller bearing structure which includes the collar 158 fixed to the worm stem 30 as by screw 158a, the tapered roller bearings 156, the annular wedge member 155, and the jacking screw 157. The exact position of the cutting edges of the knives 152a, 152b, etc., relative to the outer face of die 40 is adjustable by loosening set screw 154 and adjusting the position of pulley 153.

The operation of the apparatus will be apparent. The pliable material containing the volatile substance is squeezed initially in such a manner as to separate out large volumes of liquid, leaving a material containing less than 10% by weight of such volatiles, preferably less than 6% by weight, which material is subjected to high pressure just upstream of the restrictor 141 and expands into the space 143, forming pores which are intercommunicating or non-intercommunicating. This porous material reaches the die and, upon extrusion through the die orifice, the material is in a flowable condition and at an elevated temperature by reason of the mechanical work that has been performed upon it, and also by reason of any external heat that may be supplied. It is to be emphasized that in the case of some materials, the addition of heat is unnecessary and in certain cases it may even be desired to provide external cooling. In any event, the material as it emerges from the die orifice is formed into a multiplicity of thin chips which have a large surface area per unit of thickness. This is an important and advantageous feature of this invention. Such thin chips are then conducted to a dryer which forms the material into a fluidized bed as heretofore described where, in such a fluidized condition, the chips are concurrently dried and conveyed. By subjecting the chips to the active jets of hot dry gaseous fluid, they are continuously moved longitudinally up and down and also forwardly. This removes volatiles extremely rapidly with great efficiency not only because of the action of the fluidized bed dryer but by the coaction of the extremely large surface area that has been produced by the rapid cutting of the material into particles which have large surface area per unit of weight.

Although this invention has particular advantage in connection with the dewatering and drying of rubber, it will be appreciated that it is also of advantage in the removal of squeezable liquids from a wide variety of other materials. In the case of rubber, the fact that the initial dewatering was performed by squeezing at high temperature followed by expansion ultimately results in vaporization and thus the production of porous wafers at the knife, and the production of porous wafers is particularly highly advantageous because even more surface area is exposed for rapid devolatilization in the fluidized bed dryer. This advantage is attained with other plastic materials as well.

Another advantage of this invention is that, immediately after cutting, the wafers can be conducted directly to the drying step, without permitting them to cool between such steps.

Still another advantage of this invention is that, during the drying operation, it is unnecessary to provide temperatures which are sufficiently high to boil the volatile ingredient, but that the volatile ingredient can instead be removed at temperatures below its boiling point by operation of the laws of vapor pressure, using a dry gas as heretofore described.

Although this invention has been described specifically with respect to the dewatering machine of the aforementioned Rossiter Patent No. 3,035,306 as one part thereof, it will be appreciated that other devices for dewatering may be substituted in the combination according to this invention.

It will be appreciated that, if desired, a further separate conveyor may be provided for cooling the wafers after they have been dried completely.

The combination appearing in FIG. 10 is highly advantageous in and of itself. The adjustable plug, which may be moved through very slight distances toward and away from the reverse flight, provides a means for regulating the back pressure measured at the gage. By making adjustmentts of such plug, the operator may readily raise the temperature of the material, decrease its water content and otherwise closely regulate the operation of the apparatus and the nature of the wafer or thin particles that are produced.

Where in this specification reference has been made to wafers, it is to be understood that some plastic materials have a tendency to shatter or break when cut, and that the resulting particles are not necessarily disc-like in shape, but may take on various shapes. However, a common characteristic of all wafers or particles produced in accordance with this invention is that they are very thin and that they have a large surface area per unit of weight. Also, in accordance with a preferred form of this invention, they are highly porous and lend themselves particularly well to devolatilization in the fluidized bed conveyor.

Although this invention has been described with reference to specific forms thereof, it will be appreciated that various modifications may be made, including substitution of equivalent elements for those specifically shown and described, reversals of parts, and the use of certain features independently of the use of others, all without departing from the spirit and scope of this invention as defined in the appended claims.

The following is claimed:

1. Apparatus for removing a volatile substance from a plastic material comprising means forming an orifice, extruder means arranged upstream of said orifice, said extruder means includes an elongated worm having a forwardly arranged flight portion and also having a resistor portion downstream thereof, and wherein a movable restrictor member which is adjustable from outside said extruder means and extends toward said resistor portion and is movably adjustable radially toward and away from said resistor portion in a manner to regulate the back pressure in the material upstream of said restrictor member, means for driving said extruder to force said material through said orifice, cutter means movable rapidly across said orifice to cut the material emerging from said orifice, variable speed drive means for moving said cutter at a controllable speed which is so great relative to the speed of said extruder means that said cutter cuts said material into chips having a maximum thickness of $3/32$ inch, means forming a housing arranged to collect said chips, a combined hot fluid dryer and conveyor, and means for delivering said chips from said housing to said dryer and conveyor, said dryer having a bed portion provided with a multiplicity of upwardly directed jet orifices, and means for forcing a hot gaseous drying fluid upwardly through said orifices forming jets which dry and suspend said chips as they are conveyed.

2. The apparatus defined in claim 1 wherein said resistor member includes a reversely arranged flight.

3. Apparatus for converting a plastic material into a readily dryable form comprising a housing, a worm rotatably mounted in said housing, means for rotating said worm, a forwardly arranged flight section on said worm to work and advance said material, an orifice structure spaced downstream of said forward flight section and secured to said worm for rotation therewith, a restrictor section on said worm upstream of said orifice structure and downstream of said forwardly arranged flight section, means forming an expansion space in said housing just upstream of said orifice structure and downstream of said restrictor, with capacity to render the material porous before it reaches said orifice structure, a cutter mounted coaxially with said orifice and arranged for movement adjacent the downstream face of said orifice structure, and controllable means for rotating said cutter much faster than said orifice structure to cut into thin chips the porous material emanating from said orifice structure.

4. The apparatus as defined in claim 3, said controllable means is provided wherein said worm is rotated at a speed of about 20–250 r.p.m. and the speed of rotation of said cutter is about 500–3500 r.p.m.

5. Apparatus for removing a volatile substance from a plastic material comprising an elongated housing, an elongated worm rotatably mounted in said housing, means for rotating said worm at a predetermined speed, a forwardly arranged flight section on said worm, an orifice structure spaced downstream of said forward flight section and secured to said worm for rotation therewith, a restrictor section on said worm upstream of said orifice structure and downstream of said forwardly arranged flight section, a cutter mounted coaxially with said orifice and arranged for movement adjacent the downstream face of said orifice structure, variable speed drive means for rotating said cutter much faster than said orifice structure to cut into thin chips the material emanating from said orifice structure, and a fluid bed conveyor having a floor and a series of orifices directed generally upwardly and arranged just downstream of said cutter for drying and conveying said chips under the influence of a multiplicity of jets of hot dry gaseous fluid.

6. In a method of removing a liquid substance from a plastic material containing less than about 10% by weight of such substance, the steps which comprise continuously extruding said material in a plastic condition and at an elevated temperature, subjecting said extruded material to elevated pressure and then releasing said material to an area of low pressure thereby rendering said material porous, passing said porous material through a die orifice, continuously cutting said material as it emerges from said orifice, varying the speed of cutting relative to the speed of emergence of the material to form said material into a multiplicity of thin chips from about 1/64 to 3/32 inch thick and about 1/8 to 1½ inch diameter and having large surface area per unit of thickness, conducting said chips away from said die orifice directly to a drying conveyor, in said conveyor continuously drying and conducting said chips longitudinally and up and down by subjecting them to a multiplicity of upwardly directed jets of hot dry gaseous fluid, removing gaseous fluid and substance from said enclosure, and removing the chips from the enclosure after removal of said substance from said chips.

References Cited
UNITED STATES PATENTS

| | | | |
|---|---|---|---|
| 2,833,750 | 5/1958 | Vickers | 260—85.3 |
| 3,035,306 | 5/1962 | Rossiter | 18—2 X |
| 3,070,836 | 1/1963 | De Haven et al. | 18—2 X |
| 3,166,383 | 1/1965 | Morris | 34—10 |
| 3,222,797 | 12/1965 | Zies | 34—17 |
| 3,241,246 | 3/1966 | Pollock | 34—10 |

FREDERICK L. MATTESON, JR., *Primary Examiner.*

JOHN J. CAMBY, *Examiner.*